United States Patent
Kuehn et al.

(10) Patent No.: US 8,420,992 B2
(45) Date of Patent: Apr. 16, 2013

(54) MICROSCOPE

(75) Inventors: Peter Kuehn, Jena (DE); Dietmar Schmidt, Bibra (DE); Thomas Mehner, Kleinromstedt (DE)

(73) Assignee: Carl Zeiss MicroImaging GmbH, Jena (DE)

( * ) Notice: Subject to any disclaimer, the term of this patent is extended or adjusted under 35 U.S.C. 154(b) by 390 days.

(21) Appl. No.: 12/905,246

(22) Filed: Oct. 15, 2010

(65) Prior Publication Data
US 2011/0090561 A1    Apr. 21, 2011

(30) Foreign Application Priority Data
Oct. 16, 2009  (DE) .......................... 10 2009 050 020

(51) Int. Cl.
  *G02B 21/06*    (2006.01)
(52) U.S. Cl.
  USPC ...................... 250/201.2; 250/201.3; 359/385
(58) Field of Classification Search ............... 250/201.2, 250/201.3; 359/385
  See application file for complete search history.

(56) References Cited

U.S. PATENT DOCUMENTS

| | | | | |
|---|---|---|---|---|
| 2005/0123206 A1* | 6/2005 | Sakai et al. | .................... | 382/238 |
| 2010/0110538 A1* | 5/2010 | Steffen et al. | ................. | 359/363 |
| 2012/0162754 A1* | 6/2012 | Liedtke | .......................... | 359/385 |

* cited by examiner

*Primary Examiner* — Tony Ko
(74) *Attorney, Agent, or Firm* — Frommer Lawrence & Haug LPP

(57) ABSTRACT

In microscopes, particularly laser scanning microscopes, for detecting light coming from a sample, it is known to protect detectors from excessively high light outputs by means of shutters in the detection beam path. Further, in order to measure the light output impinging on the detector when the detection beam path is closed, a portion of the light is coupled out of the detection beam path and directed to a monitor diode. Constructions of this kind are complicated and costly. In the microscope according to the invention, a monitor diode is arranged on the shutter in such a way that the monitor diode is situated in the detection beam path when the shutter is closed. This makes it possible in a simple manner to measure the light output in a microscope when the detection beam path is closed even without additionally coupling light out of the detection beam path.

14 Claims, 3 Drawing Sheets

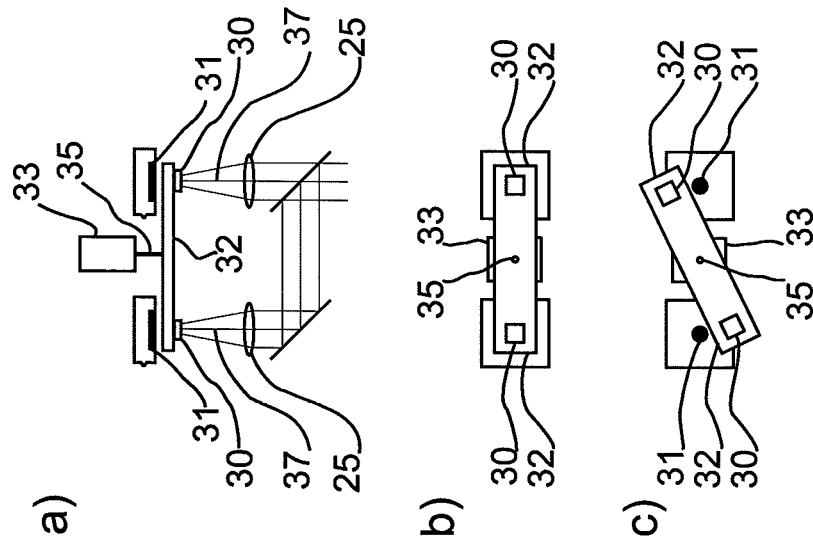
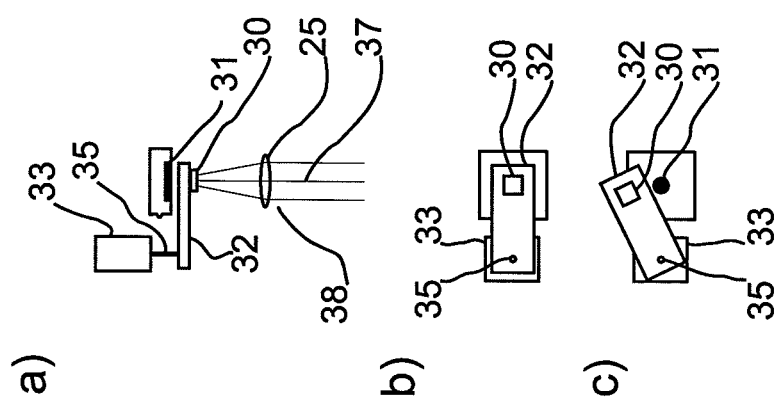

MICROSCOPE

The present application claims priority from German Patent Application No. DE 10 2009 050 020.0 filed on Oct. 16, 2009, the disclosure of which is incorporated herein by reference in its entirety.

BACKGROUND OF THE INVENTION

1. Field of the Invention

The invention is directed to a microscope, preferably a laser scanning microscope, with at least one detector for detecting sample light coming from a sample, wherein the detector is protected from excessively high light outputs by at least one shutter.

2. Description of Related Art

Microscopes of the type mentioned above generally have detectors, for example, but not exclusively, CCD sensors, photomultiplier tubes (PMTs) or avalanche photo diodes (APDs) for detecting sample light such as, for example, fluorescent light. Particularly when using detectors designed for detecting very low light outputs or when light outputs in excess of the dynamic range of the detectors can occur, shutters are often arranged in front of the detectors in the detection beam path of the microscope. The shutters serve to protect the detectors against damage or premature aging due to excessively high light outputs (light intensities) of the sample light or of extraneous light. Extraneous light includes all light which is not intended for detection and which, therefore, should not reach the detector.

Mechanical shutters (slides, flaps, or the like), acousto-optical or electro-optical components or liquid crystal elements can be used as shutters. The shutters are generally controlled by a control unit depending on the operating state of the microscope. For example, the shutters can be controlled in such a way that they only open the detection beam path when sample light is to be measured, and the detection beam path remains closed when changing the settings of the microscope (for example, when changing the objective, filter or sample).

However, in an arrangement of this kind excessive light output cannot be prevented from striking the detector after opening the detection beam path because the shutter is controlled independently from the light output and this light output can only be measured by the detector after the shutter is opened.

To remedy this problem, it is known to use additional detectors, so-called monitor diodes, to measure the light output in the detection beam path also when the detection beam path is closed by the shutter. An arrangement of this kind is described, for example, in DE10253609A1. In this case, a portion of the light output is coupled out of the detection beam path of a scanning microscope before the shutter by a beamsplitter and is directed to an additional detector (i.e., the monitor diode). If the light output measured by the monitor diode exceeds a predetermined value, the detection beam path is closed by the shutter in front of the detector.

The arrangement described in DE 10253609A1 has some drawbacks, particularly when low light outputs must be detected. As a result of the necessity of coupling a portion of the light output out of the detection beam path to the monitor diode, not all of the sample light coming from the sample reaches the detector. Therefore, the detecting efficiency of the microscope is reduced. Also, the use of acousto-optical or electro-optical components and liquid crystal elements as shutters is disadvantageous because they can likewise lead to an attenuation of the light output to be detected and are more cost-intensive than mechanical solutions.

SUMMARY OF THE INVENTION

It is the object of the invention to provide an improved microscope of the type mentioned above in which detectors can be efficiently protected from excessively high light outputs and which can be produced and used at lower cost.

The above-stated object is met through a microscope having the features indicated in claim 1.

Advantageous embodiments of the invention are indicated in the dependent claims.

The invention will be described more fully in the following with reference to embodiment examples.

According to the invention, the microscope has at least one detector for detecting sample light, a detection beam path with an optical axis, and at least one shutter having at least one monitor diode. The shutter serves to open and close the detection beam path and is arranged in front of the detector in the detection beam path. The monitor diode is arranged on the side of the shutter remote of the detector in such a way that it is located substantially on the optical axis of the detection beam path when the detection beam path is closed. Therefore, it can detect both sample light and extraneous light. Further, a control unit is provided which receives signals from the monitor diode and/or detector and controls a motor moving the shutter.

Optics which focus light on the detector are preferably provided for the detection of low light outputs. The shutter is designed in such a way that the monitor diode is located in, or in the vicinity of, a focus of the light when the detection beam path is closed. The active surface of the monitor diode then advantageously collects all of the light arriving at this point in order to achieve the best possible signal-to-noise ratio. In this way, the monitor diode can also detect low light outputs.

In a preferred embodiment form, the shutter is designed as a closing flap. This closing flap is mounted so as to be rotatable around an axis of rotation oriented substantially collinear with the optical axis of the detection beam path. The detection beam path can be opened or closed by rotating the closing flap around this axis of rotation.

In this embodiment form, a closing flap can advantageously be used to shield a plurality of detectors. At least one detector is then preferably located on each side of the axis of rotation. A plurality of monitor diodes can also be arranged on the closing flap so that a monitor diode can be located in front of every detector when the closing flap is closed.

The monitor diode and associated electronic components can be arranged on a printed circuit board on the closing flap. In a special embodiment form, the printed circuit board itself is used as the closing flap so that no additional material is required for the shutter.

In another preferred embodiment form, the shutter is rotatable around an axis which is oriented substantially perpendicular to the optical axis of the beam path. This arrangement is particularly space-saving. This is especially true when there is no space available at the sides of the detectors for installing the shutter and its movement mechanism.

The movement of the closing flap can be carried out, for example, by means of magnetic switches or electric motors. It may be advantageous to de-energize the motor when measurements are being carried out by the detectors so as not to disturb the sensitive detectors. In order to maintain its position when the motor is de-energized, the shutter can be provided with a catch (e.g., spring catch, magnetic holder, or the like). If it is not possible for reasons of space to connect the motor directly to the closing flap, a coupling can also be carried out, for example, by a belt drive or lever.

Further, the shutter can also conceivably be constructed as a closing slide or as a rotatable cylinder with a light passage.

When the detection beam path is closed, the light falls on the monitor diode which sends a signal corresponding to the measured light output to a control unit. Provided that a default limiting value is not exceeded, the detection beam path can be opened. The light then reaches the detector. When the shutter is open, the detector sends a signal corresponding to the measured light output to the control unit. When a default limiting value is exceeded, the control unit closes the detection beam path by means of the shutter to protect the detector from excessively high light outputs. When the detection beam path is closed, the light output is measured by the monitor diode. This control of the shutter can be combined with a prior art control depending on the operating state of the microscope.

BRIEF DESCRIPTION OF THE DRAWINGS

FIG. 2 shows a first schematic diagram of a detector arrangement according to the invention;

FIG. 3 shows a second schematic diagram of a detector arrangement according to the invention;

In the drawings, identical parts have identical reference numerals.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Figure 1:
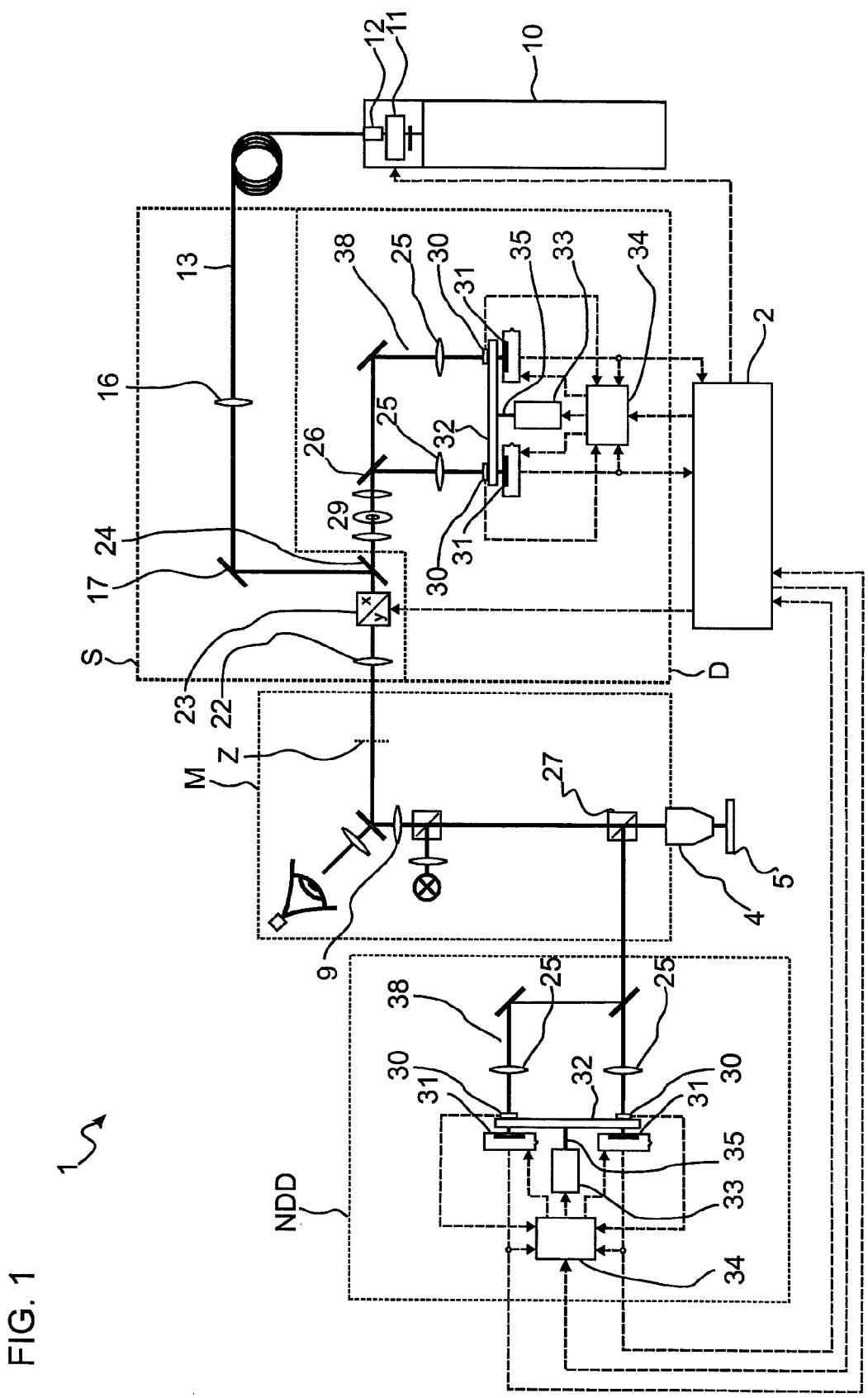
FIG. 1 shows a microscope.

FIG. 1 shows a schematic diagram of a microscope 1 in the form of a laser scanning microscope. It comprises a microscope unit M and a scan unit S having a common optical interface via an intermediate imaging Z and further comprises a detection unit for descanned detection D and another detection unit for non-descanned detection NDD. The scan unit S can be connected to the phototube of an upright microscope and to a side output of an inverted microscope. The microscope unit M has an objective 4 and a tube lens 9 for observing a sample 5. A laser 10 is provided as measurement light source, and its laser beam initially propagates freely after exiting and passes through an acousto-optical component 11, for example, an AOTF. The laser beam is then coupled into the illumination beam path of the scan unit S through coupling optics 12 and a light-conducting fiber 13. The laser beam can be stopped down by the acousto-optical component 11 of the control unit 2.

The scan unit S contains collimating optics 16, a deflecting mirror 17, a scanning objective 22, a scanner 23, and a main color splitter 24. The sample light coming from the sample reaches the detection unit D through pinhole optics 29. The sample light is spectrally split through an auxiliary color splitter 26 and directed to a plurality of detectors 31 via imaging optics 25. A closing flap 32 on which monitor diodes 30 are arranged is located in front of the detectors. The shutter 32 is opened and closed by a motor 33 which is controlled by a control unit 34.

In addition or alternatively, the microscope can also be provided with a non-descanned detection unit NDD. Sample light then reaches the non-descanned detection unit NDD via an NDD beamsplitter 27 which is preferably arranged in proximity to the objective. The non-descanned detection unit can also be used in a known manner with transmitted light (not shown).

FIG. 2 is a schematic diagram showing an arrangement according to the invention with an individual detector. Sample light coming from the sample and/or extraneous light is focused on the detector 31 by imaging optics 25 along an optical axis 37 of a detection beam path 38. When the detection beam path 38 is closed by the closing flap 32, the sample light and/or extraneous light falls on the monitor diode 30 and cannot reach the detector 31 (FIG. 2b). The shutter is connected to a motor 33 by an axis 35 which is substantially collinear with the optical axis 37 of the detection beam path 38. When the detection beam path is closed (FIG. 2b), the shutter 32 shields the detector from the sample light and/or extraneous light. When the detection beam path is open, the shutter is rotated out of the detection beam path and unblocks the detector 31 (FIG. 2c). The shutter can be locked by a spring catch (not shown) in both positions so that the motor 33 can be de-energized during the detection of the sample light.

FIG. 3 shows an arrangement similar to that shown in FIG. 2 for two detectors which are shielded by a shared closing flap 32. The detectors 31 can be shielded from the sample light and/or extraneous light simultaneously by rotating the closing flap 32 around the axis 35 which is collinear with the optical axis 37.

Figure 4:
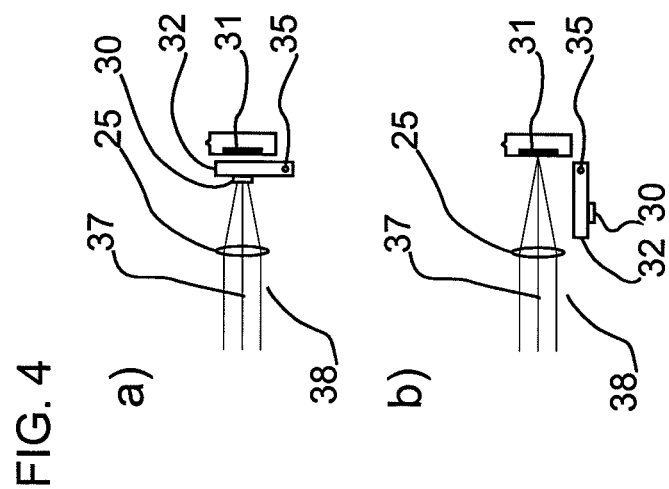
FIG. 4 shows a third schematic diagram of a detector arrangement according to the invention.

FIG. 4 shows another arrangement according to the invention. Sample light coming from the sample and/or extraneous light is focused on the detector 31 by imaging optics 25 along an optical axis of a detection beam path. When the detection beam path is closed by the closing flap 32, the sample light falls on the monitor diode 30 and cannot reach the detector 31. The shutter is connected to a motor 33 by an axis 35 which is substantially perpendicular to the optical axis of the detection beam path. When the detection beam path is closed (FIG. 2b), the shutter 32 shields the detector from the sample light and/or extraneous light. When the detection beam path is open, the shutter is folded out of the detection beam path and unblocks the detector 31. The shutter can be locked by a spring catch (not shown) in both positions so that the motor 33 can be de-energized during the measurement of sample light.

Figure 5:
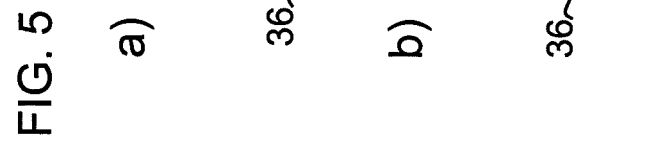
FIG. 5 shows a fourth schematic diagram of a detector arrangement according to the invention.

FIG. 5 shows another arrangement according to the invention with a slide 36 for closing and opening the detection beam path. The slide can be moved by a motor 33.

Figure 6:
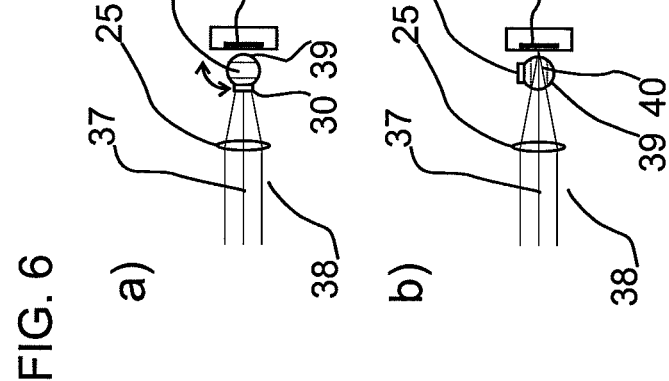
FIG. 6 shows a fifth schematic diagram of a detector arrangement according to the invention.

FIG. 6 shows another arrangement according to the invention with a rotatable cylinder 39 having a light passage 40 and monitor diode 30. When the detection beam path 38 is closed, the light falls on the monitor diode 30 (FIG. 6a). To open the detection beam path, the cylinder 39 is rotated in such a way that the light passage 40 is oriented substantially collinear with the optical axis 37 of the detection beam path 38. The light can then reach the detector 31 through the light passage 40 (FIG. 6b).

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

REFERENCE NUMERALS 1 microscope
2 system control
4 objective
5 sample
9 tube lens
10 laser
11 acousto-optical component
12 coupling optics
13 light-conducting fiber
16 collimating optics
17 deflecting mirror
22 scanning objective
23 scanner
24 main color splitter
25 imaging optics
26 auxiliary color splitter
27 NDD beamsplitter
29 pinhole optics
30 monitor diode
31 detector
32 closing flap
33 motor
34 control unit
35 axis
36 slide
37 optical axis
38 detection beam path
39 cylinder
40 passage
M microscope unit
S scan unit
Z intermediate imaging
D detection unit
NDD non-descanned detection unit

What is claimed is:

1. A microscope comprising:
   a detection beam path including:
      an optical axis; and
      at least one detector for detecting sample light coming from the sample, and
   at least one shutter arranged in the detection beam path configured to open and close the detection beam path;
   wherein the shutter has at least one monitor diode configured to measure sample light and/or extraneous light when the detection beam path is closed.

2. The microscope according to claim 1;
   wherein the shutter is designed as a slide.
3. The microscope according to claim 1;
   wherein the shutter is designed as a rotatable closing flap which closes the detection beam path by rotating around an axis which is collinear with the optical axis of the detection beam path.
4. The microscope according to claim 1;
   wherein the shutter closes the detection beam path by rotating around an axis which is perpendicular to the optical axis of the detection beam path.
5. The microscope according to claim 1, further comprising:
   at least one catch position configured to hold the shutter when the beam path is open and/or when the beam path is closed.
6. The microscope according to claim 1;
   wherein the shutter simultaneously closes a plurality of detection beam paths.
7. The microscope according to claim 1;
   wherein the monitor diode is arranged on a printed circuit board and the printed circuit board forms the shutter.
8. A method for detecting sample light with a microscope according to claim 1;
   wherein the shutter is moved by a motor.
9. The method for detecting sample light according to claim 8;
   wherein the motor is de-energized during detection of the sample light.
10. A method for detecting sample light with a microscope which has a detection beam path with an optical axis and at least one detector configured to detect sample light coming from the sample, and at least one shutter arranged in the detection beam path configured to open and close the detection beam path, wherein the shutter has at least one monitor diode configured to measure sample light and/or extraneous light when the detection beam path is closed, the method comprising:
    controlling the shutter by a control unit;
    evaluating signals of the detector with the control unit when the detection beam path is open; and
    evaluating signals of the monitor diode with the control unit when the detection beam path is closed.
11. The method according to claim 10;
    wherein the control unit controls a motor for moving the shutter.
12. The method according to claim 11;
    wherein the motor rotates the shutter around an axis extending perpendicular to the optical axis of the detection beam path.
13. The method according to claim 12;
    wherein the motor rotates the shutter around an axis extending collinear with the optical axis of the detection beam path.
14. The method according to claim 11;
    wherein the control unit de-energizes the motor during the detection of the sample light.

* * * * *